United States Patent
Tan et al.

(10) Patent No.: US 12,403,740 B2
(45) Date of Patent: Sep. 2, 2025

(54) ACTIVE SUSPENSION DAMPING

(71) Applicant: Rivian IP Holdings, LLC, Irvine, CA (US)

(72) Inventors: Derrick Michael Tan, Reseda, CA (US); Luke Lynch, Costa Mesa, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 20 days.

(21) Appl. No.: 17/866,116

(22) Filed: Jul. 15, 2022

(65) Prior Publication Data
US 2023/0086480 A1  Mar. 23, 2023

Related U.S. Application Data

(60) Provisional application No. 63/261,341, filed on Sep. 17, 2021.

(51) Int. Cl.
*B60G 17/0165* (2006.01)
*B60G 17/015* (2006.01)
(Continued)

(52) U.S. Cl.
CPC ..... *B60G 17/0165* (2013.01); *B60G 17/0152* (2013.01); *B60G 17/0162* (2013.01);
(Continued)

(58) Field of Classification Search
CPC ............ B60G 17/0152; B60G 17/0162; B60G 17/0165; B60G 17/08; B60G 2202/24;
(Continued)

(56) References Cited

U.S. PATENT DOCUMENTS 4,600,215 A * 7/1986 Kuroki .................... G01S 15/88
188/282.4
4,616,848 A * 10/1986 Sugasawa .......... B60G 17/0165
180/41
(Continued)

FOREIGN PATENT DOCUMENTS

CN       111361381 A  *  7/2020
DE  102010051773 A1 *  5/2012  ......... B60G 17/0165
(Continued)

OTHER PUBLICATIONS

Liu, et al., "General Theory of Skyhook Control and Its Application to Semi-Active Suspension Control Strategy Design", IEEE Access 7: 101552-101560 (2019).
(Continued)

*Primary Examiner* — John M Zaleskas
(74) *Attorney, Agent, or Firm* — Haley Guiliano LLP (57) ABSTRACT

Example illustrations are directed to a damping system for a vehicle suspension that includes a controller configured to determine a roughness of a ground surface associated with the vehicle. The controller is also configured to determine a damper setting for the damping system based on the determined roughness. A method is also provided that includes determining, using a controller, a roughness of a ground surface associated with the vehicle. The method may further include determining, using the controller, a damper setting of the vehicle based on the determined roughness.

20 Claims, 7 Drawing Sheets

US 12,403,740 B2
Page 2

(51) Int. Cl.
   *B60G 17/016* (2006.01)
   *B60G 17/08* (2006.01)

(52) U.S. Cl.
   CPC .......... *B60G 17/08* (2013.01); *B60G 2202/24* (2013.01); *B60G 2400/204* (2013.01); *B60G 2400/252* (2013.01); *B60G 2400/32* (2013.01); *B60G 2400/39* (2013.01); *B60G 2400/412* (2013.01); *B60G 2400/44* (2013.01); *B60G 2400/821* (2013.01); *B60G 2400/90* (2013.01); *B60G 2500/10* (2013.01); *B60G 2500/11* (2013.01); *B60G 2500/30* (2013.01)

(58) Field of Classification Search
   CPC ........ B60G 2400/252; B60G 2400/821; B60G 2500/10; B60G 2500/30
   See application file for complete search history.

(56) References Cited

U.S. PATENT DOCUMENTS

| | | | | |
|---|---|---|---|---|
| 4,657,280 A * | 4/1987 | Ohmori | ............ | B60G 17/0165 280/124.108 |
| 4,674,767 A * | 6/1987 | Kuroki | ............ | B60G 17/0165 280/5.513 |
| 4,685,698 A * | 8/1987 | Klinkner | ............ | B60G 17/018 188/266.2 |
| 4,717,173 A * | 1/1988 | Sugasawa | ............ | B60G 21/05 280/5.511 |
| 4,770,438 A * | 9/1988 | Sugasawa | ........ | B60G 17/01941 188/266.7 |
| 4,809,197 A * | 2/1989 | Tashiro | ............ | B60G 17/0165 73/146 |
| 4,827,416 A * | 5/1989 | Kawagoe | ............ | B60G 17/016 280/5.513 |
| 4,861,067 A * | 8/1989 | Booher | ............ | B29C 70/52 280/124.101 |
| 5,015,007 A * | 5/1991 | Uchiyama | ............ | B60G 17/015 280/5.514 |
| 5,083,275 A * | 1/1992 | Kawagoe | ............ | B60G 17/016 280/5.514 |
| 5,127,667 A * | 7/1992 | Okuda | ............ | B60G 17/0165 280/5.513 |
| 5,161,816 A * | 11/1992 | Okuda | ............ | B60G 17/0165 280/5.515 |
| 5,162,996 A * | 11/1992 | Matsumoto | .......... | B60G 17/018 701/37 |
| 5,347,457 A * | 9/1994 | Tanaka | ............ | B60G 17/0416 280/5.514 |
| 5,432,700 A * | 7/1995 | Hrovat | ............ | B60G 17/0165 280/5.515 |
| 5,445,405 A * | 8/1995 | Onozawa | ............ | B60G 17/019 280/5.506 |
| 5,467,280 A * | 11/1995 | Kimura | ................. | B60G 17/08 280/5.515 |
| 5,497,325 A * | 3/1996 | Mine | ................. | B60G 17/0165 280/5.518 |
| 5,539,640 A * | 7/1996 | Kishimoto | ......... | B60G 17/0165 701/40 |
| 5,802,486 A * | 9/1998 | Uchiyama | ............ | F16F 9/467 280/5.52 |
| 5,810,384 A * | 9/1998 | Iwasaki | ............ | B60G 17/018 280/5.514 |
| 5,911,768 A * | 6/1999 | Sasaki | ............ | B60G 17/0165 701/37 |
| 5,944,763 A * | 8/1999 | Iwasaki | ............ | B60G 17/0165 701/37 |
| 6,058,340 A * | 5/2000 | Uchiyama | .......... | B60G 17/0165 280/5.514 |
| 6,164,665 A * | 12/2000 | Lentz | ................. | B60G 17/015 280/124.157 |
| 6,247,683 B1 * | 6/2001 | Hayakawa | ............ | F16F 9/06 267/64.11 |
| 2002/0045977 A1 * | 4/2002 | Uchiyama | ........ | B60G 17/01908 280/5.515 |
| 2002/0103587 A1 * | 8/2002 | Kim | ..................... | B60G 17/016 701/37 |
| 2002/0103588 A1 * | 8/2002 | Kim | ..................... | B60G 17/0195 701/37 |
| 2002/0107620 A1 * | 8/2002 | Kim | ..................... | B60G 17/0195 280/5.515 |
| 2003/0094774 A1 * | 5/2003 | Burdock | ............ | B60G 17/0162 280/5.502 |
| 2003/0189300 A1 * | 10/2003 | Burdock | ............ | B60G 17/0162 280/5.518 |
| 2004/0094912 A1 * | 5/2004 | Niwa | .................. | B60G 17/0165 280/5.518 |
| 2005/0077692 A1 * | 4/2005 | Ogawa | .................... | B60G 17/08 280/5.517 |
| 2005/0090956 A1 * | 4/2005 | Ogawa | .................... | B60G 17/08 701/532 |
| 2005/0178628 A1 * | 8/2005 | Uchino | ................. | B60G 17/016 188/379 |
| 2005/0212225 A1 * | 9/2005 | Suzuki | ............... | B60G 17/0523 280/5.514 |
| 2006/0284387 A1 * | 12/2006 | Klees | ................. | B60G 17/0165 701/37 |
| 2009/0043452 A1 * | 2/2009 | Sekiya | .................... | F16F 9/535 701/40 |
| 2009/0097038 A1 * | 4/2009 | Higgins-Luthman | ........ | B60G 17/019 356/602 |
| 2009/0187310 A1 * | 7/2009 | Ogawa | .................... | B60G 17/08 701/38 |
| 2010/0152969 A1 * | 6/2010 | Li | ....................... | B60G 17/0165 701/37 |
| 2010/0324781 A1 * | 12/2010 | Gagliano | ............. | B60G 17/018 701/39 |
| 2011/0035103 A1 * | 2/2011 | Arenz | .................... | B60G 17/0185 701/37 |
| 2011/0127127 A1 * | 6/2011 | Hirao | ..................... | B60G 17/08 188/266.2 |
| 2012/0203429 A1 * | 8/2012 | Liebold | .................. | B60G 17/08 701/37 |
| 2012/0296521 A1 * | 11/2012 | Hanisch | .................... | B60P 3/00 701/38 |
| 2013/0103259 A1 * | 4/2013 | Eng | ..................... | B60G 17/0165 701/37 |
| 2014/0125018 A1 * | 5/2014 | Brady | .................. | B60G 17/016 280/5.519 |
| 2014/0195112 A1 * | 7/2014 | Lu | ........................ | B60G 17/015 703/2 |
| 2014/0222287 A1 * | 8/2014 | Popham | .................. | B60G 17/0165 701/37 |
| 2014/0303844 A1 * | 10/2014 | Hoffmann | ............. | B60G 17/08 701/37 |
| 2014/0330483 A1 * | 11/2014 | Lu | ........................ | B60G 17/016 701/37 |
| 2014/0358371 A1 * | 12/2014 | Kikuchi | ................. | B60W 10/18 701/37 |
| 2014/0358373 A1 * | 12/2014 | Kikuchi | ................. | B60G 17/0185 701/38 |
| 2015/0057885 A1 * | 2/2015 | Brady | .................. | B60G 17/019 701/37 |
| 2015/0314663 A1 * | 11/2015 | Rhode | ................. | B60G 17/0165 701/37 |
| 2015/0352920 A1 * | 12/2015 | Lakehal-Ayat | .... | B60G 17/0182 701/38 |
| 2016/0031287 A1 * | 2/2016 | Guest | ................. | B60G 17/0165 701/37 |
| 2016/0107499 A1 * | 4/2016 | Cho | ..................... | B60G 17/018 701/38 |
| 2016/0288608 A1 * | 10/2016 | Göhrle | ................. | B60G 17/018 |
| 2017/0066298 A1 * | 3/2017 | Allgayer | ............. | B60G 17/0182 |
| 2017/0100980 A1 * | 4/2017 | Tsuda | ................. | B60G 17/0165 |
| 2017/0240018 A1 * | 8/2017 | Mettrick | ............. | B60G 17/0182 |
| 2017/0320495 A1 * | 11/2017 | Lu | ........................ | B60W 50/10 |
| 2017/0326937 A1 * | 11/2017 | Miska | ................. | B60G 17/0165 |
| 2018/0015801 A1 * | 1/2018 | Mohamed | ............. | H04L 67/12 |

(56) References Cited

U.S. PATENT DOCUMENTS

| | | | | |
|---|---|---|---|---|
| 2018/0126992 | A1* | 5/2018 | Lu | B60W 10/12 |
| 2019/0126713 | A1* | 5/2019 | Miska | B60G 17/02 |
| 2020/0384980 | A1* | 12/2020 | Yu | B60G 17/0195 |
| 2020/0398630 | A1* | 12/2020 | Sohn | B60W 40/06 |
| 2021/0053409 | A1* | 2/2021 | Kim | B60G 17/06 |
| 2021/0107385 | A1* | 4/2021 | Kuretake | B60N 2/502 |
| 2021/0162832 | A1* | 6/2021 | Hwang | B60G 17/06 |
| 2021/0178845 | A1* | 6/2021 | Cho | B60W 30/09 |
| 2021/0339594 | A1* | 11/2021 | Wang | B60G 13/14 |
| 2022/0032709 | A1* | 2/2022 | Lee | B60G 17/0165 |
| 2022/0032711 | A1* | 2/2022 | Lee | B60G 17/01908 |
| 2022/0072924 | A1* | 3/2022 | Smits | B60G 17/00 |
| 2022/0176766 | A1* | 6/2022 | Kikuchi | B60G 17/08 |
| 2022/0305862 | A1* | 9/2022 | Konada | B60G 17/0165 |
| 2022/0305868 | A1* | 9/2022 | Konada | B60G 17/0165 |
| 2023/0040600 | A1* | 2/2023 | Abdallah | B60G 17/0155 |
| 2023/0043104 | A1* | 2/2023 | Abdallah | B60G 17/0525 |
| 2023/0045560 | A1* | 2/2023 | Abdallah | B60G 17/052 |
| 2023/0071791 | A1* | 3/2023 | Coerman | B60G 17/0165 |
| 2023/0123508 | A1* | 4/2023 | Kim | B60W 40/06 701/1 |
| 2023/0311606 | A1* | 10/2023 | Kojchev | B60G 17/08 280/5.518 |

FOREIGN PATENT DOCUMENTS

| | | | | |
|---|---|---|---|---|
| DE | 102011100387 A1 * | 11/2012 | | B60G 17/015 |
| JP | H01202510 A * | 8/1989 | | |
| WO | WO-2005014315 A1 * | 2/2005 | | B60G 17/0165 |
| WO | WO-2019102091 A1 * | 5/2019 | | |

OTHER PUBLICATIONS

Shen, et al., "Stereo Vision Based Road Surface Preview", IEEE 17th International Conference on Intelligent Transportation System (ITSC), p. 1843-1849 (Oct. 8-11, 2014).

Zin, et al., "A feedback-feedforward suspension control strategy for global chassis control through anti-roll distribution". International Journal of Vehicle Autonomous Systems 7(3/4): 22 pages (2009).

* cited by examiner

ACTIVE SUSPENSION DAMPING

CROSS-REFERENCE TO RELATED APPLICATIONS

The present application claims priority to U.S. Provisional Patent Application No. 63/261,341, filed on Sep. 17, 2021, the contents of which are hereby expressly incorporated by reference in its entirety.

INTRODUCTION

The present disclosure is directed to a vehicle suspension damping system, and more particularly to a vehicle suspension system that provides active damping in response to different conditions.

SUMMARY

Vehicles generally employ compliant elements and dampers as components of a suspension system. More specifically, compliant elements such as springs prevent road inputs such as bumps from direct transfer to the vehicle, while dampers such as shocks absorb energy to reduce transfer of the road input energy to the vehicle. Air suspension systems offer advantages that may be useful for some vehicles, e.g., by offering adjustable ride height, but also present complications for damping systems. For example, adjustments in height effected by changing air pressure in the suspension air spring can change ride behavior.

In at least some example illustrations, a damping system for a vehicle suspension includes a controller configured to determine a roughness of a ground surface associated with the vehicle. The controller is also configured to determine a damper setting for the damping system based on the determined roughness.

In at least some examples, the controller is further configured to determine the roughness based upon ride height.

In at least some example approaches, the damper setting decreases a reaction force of a damper in response to an increase in the roughness.

In at least some examples, the controller is configured to alter a gain of the controller based upon a ride height of the vehicle.

In at least some example approaches, the controller is configured to increase a reactive force of a damper based on the damper approaching an end of travel of the damper.

In at least some example illustrations, the controller is configured to advance a force request to an opposing chamber of the damper based on the damper approaching an end of travel of the damper.

In at least some examples, the damper setting is altered by changing a current supplied to the damper.

In at least some example illustrations, the determined roughness comprises a numerical value corresponding to a percentage from 0 to 100%.

In at least some example approaches, the roughness is based on a change in corner height error over a time period corresponding to the surface traversed during the time period.

In at least some examples, the damping system further includes an air suspension subsystem. The controller may be a vehicle dynamics module configured to control vehicle ride height via the air suspension system.

In at least some example illustrations, the damping system includes the one or more dampers of the vehicle, with the damper(s) being actuated by the controller.

In at least some examples, the controller is configured to return the damper setting to a nominal value based upon a detection of a decrease in the roughness.

In at least some example illustrations, a method is provided that includes determining, using a controller, a roughness of a ground surface associated with the vehicle. The method may further include determining, using the controller, a damper setting of the vehicle based on the roughness.

In at least some examples, the roughness is determined based on ride height measurements.

In at least some example illustrations, the method further includes decreasing a reaction force of a damper in response to an increase in the roughness.

In at least some example approaches, the method also includes altering a gain of the controller based upon a ride height of the vehicle.

In at least some examples, the method further includes increasing a reaction force of the damper based on the damper approaching an end of travel of the damper.

In at least some example illustrations, the method further includes advancing a force request to an opposing chamber of the damper based on the damper approaching an end of travel of the damper.

In at least some examples, the method further includes returning the damper setting to a nominal value based upon a detection of a decrease in the roughness.

In at least some examples, a non-transitory computer-readable medium is provided. The computer-readable medium may have non-transitory computer-readable instructions encoded thereon that, when executed by a processor, cause the processor to determine a roughness of a ground surface associated with the vehicle, and determine a damper setting of the vehicle based on the determined roughness.

DETAILED DESCRIPTION

Suspension damping control can involve a trade-off between handling and ride comfort when tuning a vehicle. In at least some example approaches herein, this tradeoff is minimized or eliminated by "learning" the surface. For example, ride height sensors of a vehicle may be used to determine a roughness of a surface being traversed by the vehicle. Further, in at least some examples the ride height sensors may be employed as the primary inputs for determining roughness, which may be employed to change one or more damper settings of a vehicle suspension damping system. Accordingly, ride comfort can be maximized without the cost of degraded handling performance. Damping applied by damping components of a vehicle suspension may be executed in a variable manner, based on a feedback and a feedforward control model. Additionally, a vision-based roughness prediction may be employed to control suspension and/or damping components.

As will be described further below, in at least some example approaches a roughness of a road, surface, trail, etc. may be approximated based upon vertical displacement of the wheels away from an expected or neutral position over time, or as the vehicle traverses the road, surface, trail, etc. When driving on a very smooth surface, e.g., a paved road, vehicle wheels may tend to experience minimal vertical movement. On rough surfaces, e.g., a gravel road, trail, or any off-road environment, however, surface/road inputs will drive greater vertical displacement of the wheels away from their neutral position. It will be understood that reference to a "road" roughness or surface does not encompass only paved road surfaces, but also unpaved roads, gravel, dirt, or any off-road environment.

Example roughness metrics may be determined using a function or algorithm that generally attempts to quantify how much road input the wheels experience over a distance, as a proxy for the roughness of the surface. The quantified roughness may be used to influence operation of the suspension, e.g., by setting or altering damper settings, in response to changes in roughness. Example vehicles, suspension damping systems, and methods may thus be directed to determining a roughness metric of a surface being traversed by the vehicle based on ride height measurements and setting a damper setting for the damping system based on the roughness metric. As will be elaborated further below, in some examples roughness of a surface may be determined on the basis of ride height data, e.g., provided by one or more ride height sensors of the vehicle.

In example illustrations herein, as will be elaborated further below, the vehicle 100 may alter a damper setting (e.g., force characteristics of compression/rebound chambers of a damping assembly) in response to a detection, e.g., by the vehicle 100, that a relatively rougher surface is being traversed. For example, the vehicle dynamics module 108 or other controller of vehicle 100 may be configured to adjust suspension damping settings such as damper compliance/stiffness characteristics in response to variations in roughness, e.g., to increase compliance in response to an increase in roughness, and/or decrease compliance in response to a decrease in roughness.

Damping System

Figure 1:
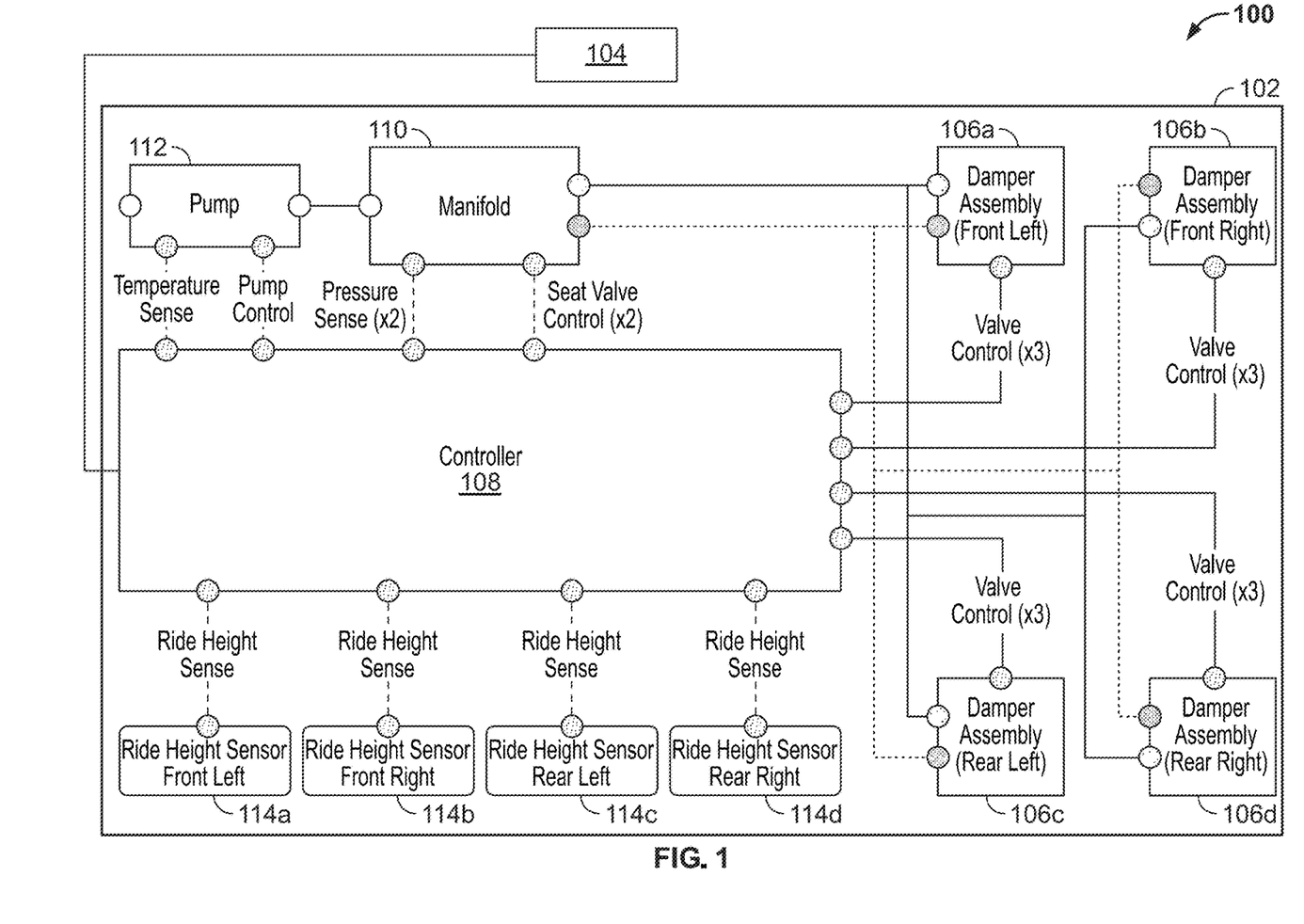
FIG. 1 shows a schematic illustration of a vehicle having a suspension damping system that allows for active damping, e.g., in response to changes in roughness of a surface, in accordance with an example approach.

Turning now to FIG. 1, a vehicle 100 is illustrated and described in further detail. The vehicle 100 may have a suspension damping system 102 configured to provide damping to reduce energy transfer from one or more vehicle wheels (not shown) via a suspension system 104. The suspension system 104 may have springs or other compliant elements. In examples herein, the suspension system 104 is an air suspension system having an air spring at each vehicle wheel.

The damping system 102 includes damper assemblies 106a, 106b, 106c, and 106d (collectively, 106) corresponding to each vehicle wheel. The damper assemblies 106 are semi-active and may provide different compression/rebound characteristics via different compression and rebound chambers, as will be discussed further below. The damper assemblies 106 generally control or limit both rebound damping forces (i.e., when the vehicle wheel is moving downward/away from the vehicle body) and compression damping forces (i.e., when the vehicle wheel is moving upward/toward the vehicle body). The damper assemblies 106 may also selectively enable and disable hydraulic anti-roll functions of the damping system 102. For example, compression and rebound characteristics of the damper assemblies 106 may be individually controlled to provide different characteristics at outboard/inboard wheels as the vehicle 100 is turned. Accordingly, the controller 108 may generally control damping forces of the damper assemblies 106 and roll stiffness of the vehicle 100.

The vehicle 100 may also include one or more controllers 108 for controlling aspects of the damping system 102, suspension system 104, and other systems of vehicle 100. In an example, the controller 108 is a vehicle dynamics controller. As illustrated in FIG. 1, the controller 108 may control damper assemblies 106 via one or more valves and may supply hydraulic fluid via a hydraulic manifold 110. More specifically, hydraulic fluid may be supplied by a pump 112 through the manifold 110. The pump 112 generally may control system hydraulic pressure. The hydraulic manifold 110 measures may measure hydraulic circuit pressures and connect/disconnect hydraulic pump 112 from hydraulic circuits 118 and 122. More specifically, as will be discussed further below hydraulic fluid may be to the damper assemblies 106 via a compression hydraulic circuit 118 and rebound hydraulic circuit 122.

The vehicle 100 also includes one or more ride height sensors 114a, 114b, 114c, and 114d (collectively, 114) which may interface with the damping system 102 and the suspension system 104. Generally, the ride height sensors 114 may measure vertical displacement between one of the vehicle wheels and the vehicle body, with one of the sensors 114 positioned at each wheel having a corresponding damper assembly 106. The ride height sensors 114 may facilitate the suspension system 104 and/or controller 108 automatically levelling the vehicle 100 and making changes to a ride height of the vehicle 100 by way of adjustments made to the air springs of the suspension system 104, e.g., in response to one or more heights measured by the ride height sensors 114. Accordingly, when the vehicle 100 is carrying a relatively heavy load in a rear cargo area, the rear ride height sensors 114c, 114d may detect that the vehicle height has been reduced. The vehicle 100 may, in response, add air to the corresponding rear air springs to level the vehicle 100. Further, various ride modes of the vehicle 100 may be provided by the controller 108 that entail changes to ride height and/or damper settings of the damping system 102.

Figure 2:
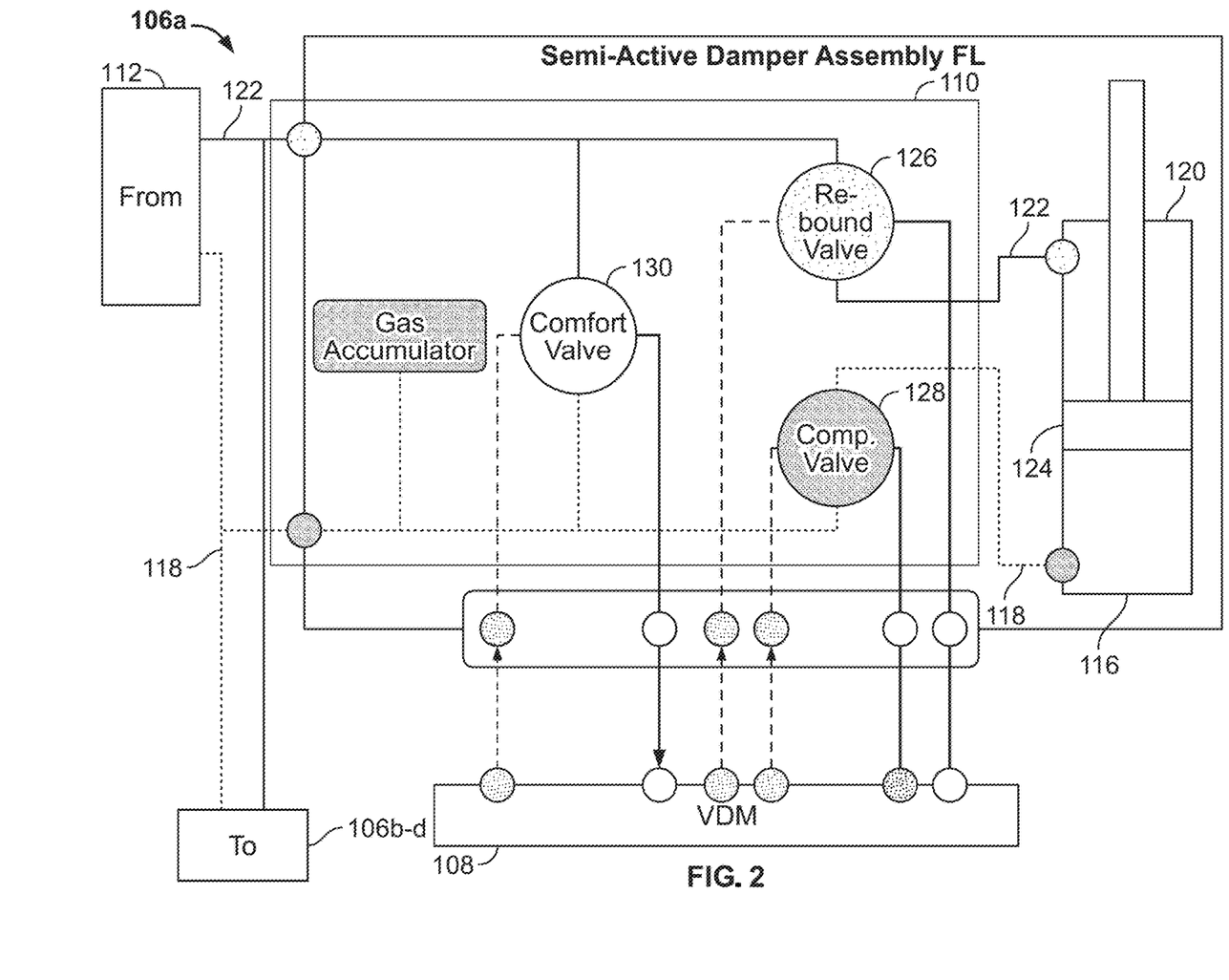
FIG. 2 shows a schematic illustration of a hydraulic damping assembly for the damping system of FIG. 1, according to an example.

Turning now to FIG. 2, the operation of the example damper assemblies 106 and associated hydraulic circuit(s) are illustrated and described in further detail. FIG. 2 illustrates the damper assembly 106a, however it will be understood that the other damper assemblies 106b, 106c, and 106d may be identical.

Damper assembly 106a may include a compression chamber 116 supplied by compression hydraulic circuit 118, and a rebound chamber 120 supplied by rebound hydraulic circuit 122. A plunger 124 may hydraulically divide the compression chamber 116 and rebound chamber 120 and move with a wheel of the vehicle 100. Controller 108 may vary hydraulic pressure of the compression chamber 116 and rebound chamber 120 to vary compression and rebound forces of the plunger 124 as the wheels of the vehicle 100 are moved up/down with respect to the body as a result of movement of the vehicle 100. The compression hydraulic circuit 118 and rebound hydraulic circuit 122 may each receive fluid pressurized by the pump 112 via one or more valves of the manifold 110. For example, as illustrated a rebound valve 126 may allow fluid from the pump 112 to the rebound chamber 120. Further, a compression valve 128 may allow fluid from the pump 112 to the compression chamber 116. Other valves or fluid circuits may be provided to further facilitate supply of desired pressure to the rebound chamber 120 and compression chamber 116. For example, a comfort valve 130 may generally balance pressure between the rebound hydraulic circuit 122 and the compression hydraulic circuit 118, e.g., by equalizing pressure between the circuits 122 and 118. When opened, there is no pressure difference between the circuits 122 and 118. As noted above, the damper assemblies 106b, 106c, and 106d are not specifically illustrated in FIG. 2, but the compression hydraulic circuit 118 and rebound hydraulic circuit may be in further fluid communication with damper assemblies 106b, 106c, and 106d in the same manner as illustrated for damper assembly 106a.

As noted above, example illustrations may provide active damping for a vehicle suspension system. In at least some examples, the ride height sensors 114 may "learn" the surface of a road or other so that controller/VDM 108 can adapt a damping stiffness of one or both (i.e., compression and rebound) chambers of damper assemblies 106 to optimize for ride comfort. The controller 108 may return to a nominal vehicle handling performance setting, e.g., upon prediction of an upcoming dynamic maneuver. The prediction of a dynamic maneuver may be performed within a Surface Learning Module (SLM) of the vehicle 100, as described further below.

Figure 3A:
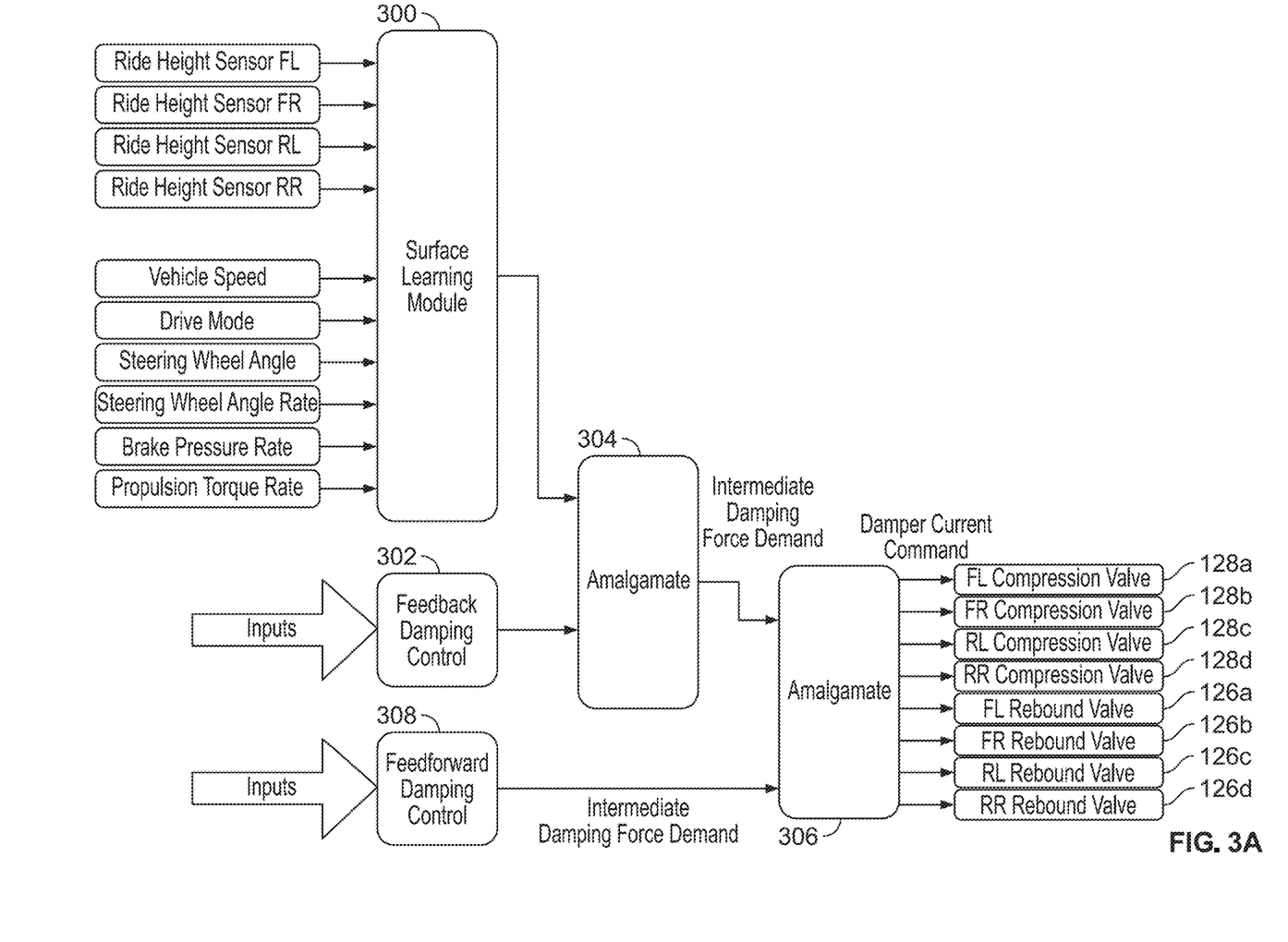
FIG. 3A shows a control methodology for a controller of a damping system, e.g., of FIGS. 1 and 2, in accordance with an example.

As shown in FIG. 3A, an example surface learning module (SLM) 300 is illustrated. The SLM 300 and other aspects of the control methodology illustrated in FIG. 3A may be tangibly embodied in the controller 108. The SLM 300 may receive inputs from one or more of the ride height sensors 114, as well as inputs indicative of vehicle speed, drive mode, steering wheel angle, steering wheel angle rate, brake pressure rate, and propulsion torque rate. Generally, roughness may be determined at block 300. Roughness may be output from block 300, and amalgamated at block 304 with an output of a feedback damping control module 302. The output of block 304 may in turn be amalgamated at block 306 with an intermediate damping force demand that is output from a feedforward damping control module 308. Amalgamation at blocks 304 and/or 306 may be performed in any manner that is convenient. In an example, respective gains of controller 108 that are output from respective input blocks of the amalgamation block 304 may be combined, e.g., by multiplying the different gains. The feedback damping control 302 may output forces (e.g., in Newtons). The forces may be determined using a vehicle model (e.g., using vehicle mass, track width, and/or wheelbase as inputs). The forces output by block 302 may be determined by estimating how much force is being generated at each of the four wheels of the vehicle. Tuning gains may be used to scale the determined forces. The feedforward damping control block 308 may further scale, or add to, the feedback forces, thereby combining the feedback forces and feedforward forces. The output of block 306 may be a current, e.g., a damper current based upon the combined feedback/feedforward forces. Generally, the amalgamation block 306 may serve two principle functions. First, the amalgamation block 306 combines the damping force demand outputs from blocks 304 and 308. For example, the amalgamation block 306 may sum the forces for each respective wheel (e.g., force feedback for front-left (FL) plus force feedforward for FL=total force for front-left damper assembly 106a). The amalgamation block 306 may also compute a required current for each corner valve to achieve the target damping force from the forces, e.g., by using the lookup table/map illustrated in FIG. 4 and described further below. In this manner, a tapering down or up of a force of damper assemblies 106 may be imposed upon feedback damping control at block 304.

A damper current command may be determined and output to control pressures within the compression chamber 116 and rebound chamber 120 (see FIG. 2). More specifically, damper current commands may be provided to compression valve 128 and rebound valve 126 for each damper assembly 106 (not shown in FIG. 3A) of each of the four vehicle wheels (i.e., front-left, front-right, rear-left, and rear-right wheels of the vehicle 100). Generally, current command to the compression/rebound valves may determine how "open" the valve (e.g., compression valve 128 or rebound valve 126) is, thereby controlling the flow of fluid through the valve. In one example, a minimum current, e.g., 0.3 Amperes (A) would result in a maximal opening of the valve 126/128 and least resistance to fluid flow through the valve. A relatively higher current (e.g., 1.6 A) would cause the valve to be relatively closed to minimize fluid flow, in turn altering damping force as a result of fluid being harder to "push" through the valve 126/128.

Damping Adjustments for Surface Roughness Changes

Generally, a uniform damping rate of a vehicle suspension system will not adequately balance damping needs in response to both larger and smaller inputs (corresponding to rougher and smoother surfaces being traversed by the vehicle, respectively). Typically, a difference between a vehicle driving over a flat road surface and a bumpy road surface is the change in wheel movement (amplitude) relative to the vehicle body over the road surface. By observing the magnitude and temporal persistence of the wheel movement, a numeric gain value, e.g., for an associated controller, e.g., controller 108, may be "learned" through a series of calculations. The calculations involved may use the ride height sensors 114 as the primary input to learn the roughness and may use auxiliary factors such as vehicle speed and drive mode to accelerate the rate of learning. An output may be a moving gain value that is constantly changing to adapt to the surface being traversed by the vehicle, e.g., of a road, trail, or any other surface. This gain value may be used as a scaling factor to refine the damper force demand calculated from the feedback controller to optimize ride comfort. This scaling factor may be removed if a dynamic maneuver is predicted to occur based on inputs such as steering angle and steering angle rate, brake pressure rate, propulsion torque rate, etc., so that nominal handling performance is returned.

Accordingly, in one aspect of the present disclosure reaction forces of a damper of a vehicle suspension system may be adjusted in response to a detection of a relatively rougher surface being traversed by the vehicle, e.g., with a reduction in reactive forces applied by the damper. Subsequently, upon a return to a relatively smoother surface, the reactive forces or other parameters may be returned to a nominal setting. Road or surface roughness may be determined based upon a roughness metric, e.g., as described further below.

The example illustrations herein may generally maximize a potential of the variable control damper hardware to optimize ride comfort and handling simultaneously.

In some examples, force reductions of a damper may be implemented by tapering force inputs or decreasing reactive forces applied by the damper, i.e., with a reduction over time or in response to increasing surface roughness. Generally, as more relatively large force inputs are observed at the damper, resistive force applied by the damper is ramped down. A rate of the tapering of the reactive forces applied by the damper may be reduced in comparison to a rate at which tapering is reversed upon detection of a smoother surface. In other words, the tapering may be activated relatively gradually upon detection of a rough surface, but may be "turned off" or the damper otherwise returned to a nominal setting more quickly upon detection that the vehicle has returned to a smoother surface.

Generally, force tapering effects may be dependent upon detected conditions such as road and/or driver inputs. A more significant driver input, e.g., relatively hard acceleration, braking, turning, etc. may reset a gain setting of controller 108 to a nominal value relatively quickly. In some examples, this tapering back up to a nominal setting, e.g., of one or more of the damper assemblies 106, can be instant.

Figure 3B:
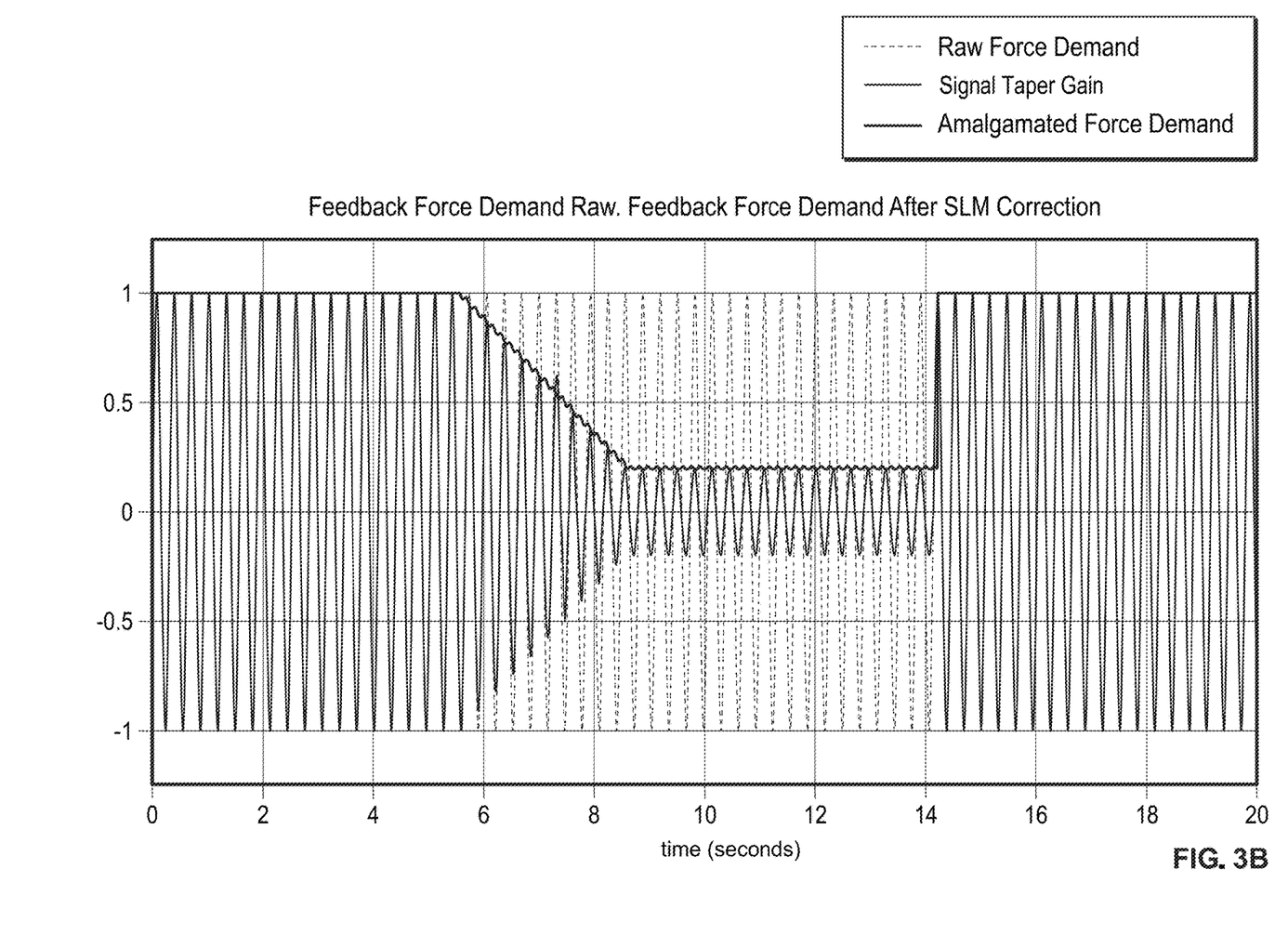
FIG. 3B shows a plot of feedback force versus time for an example damper assembly, e.g., of FIGS. 1 and 2, in accordance with an example.

Referring now to FIGS. 3A and 3B, a simulated example of the above-mentioned force tapering is discussed in further detail. Generally, a raw force demand, e.g., from feedback damping control block 302 of FIG. 3A, may remain constant. A signal taper gain, which may be a scaling multiplier, e.g., as may be output from block 300 of FIG. 3A, is also shown. A final amalgamated force demand output is also represented resulting from the combination of the raw force demand and signal taper gain, e.g., as may be output from block 304 of FIG. 3A. A generally tapering profile (i.e., a magnitude of the scaling multiplier/signal taper gain) is illustrated. More specifically, beginning at approximately 5.7 seconds the signal taper gain decreases, reaching a minimum at approximately 8.5 seconds. This tapering effect may be tunable. In the illustrated example, the signal taper gain progressively ramps down over time from a value of one (1) to a value closer to zero (0), e.g., in response to a persistent road disturbance (for example, via the ride height sensors and/or roughness determined by the controller 108). This signal taper gain, as it is a multiplier, scales down the resulting amalgamated force demand proportionally, as shown in the representation in FIG. 3B. At the approximately 14 second mark, the signal taper gain is "reset" by one of the conditions (e.g., a quick steering input), and the controller 108 removes the tapering effect to bring damping stiffness back to normal levels. As seen below, the removal of the effect is comparatively immediate (e.g., occurring within less than a tenth of a second) to the relatively more gradual tapering down of the signal (e.g., over several seconds).

Damping Adjustments for Ride Height Changes

In example systems where an air suspension system is employed that offers the ability to alter ride heights of a vehicle, changes in a ride height may affect damping. More specifically, when ride height is changed, the damper is at a different position in the damper stroke. Accordingly, in at least some example illustrations, the damper is compensated due to being positioned at a different location along the stroke of the damper.

In one such example, controller 108 modifies damper force/current based on how close the damper is to the end of its travel in a given direction. For example, additional current and/or force is provided to the damper as the stroke approaches the end of the damper's travel. In one example, the feedback damping control 302 (see FIG. 3A) may increase a gain of controller 108, thereby increasing force provided to the rebound chamber 120 or compression chamber 116. This increase in force may reduce the incidence of (or prevent entirely) hard contact and/or damage due to impact at the end of the damper's stroke.

Figure 4:
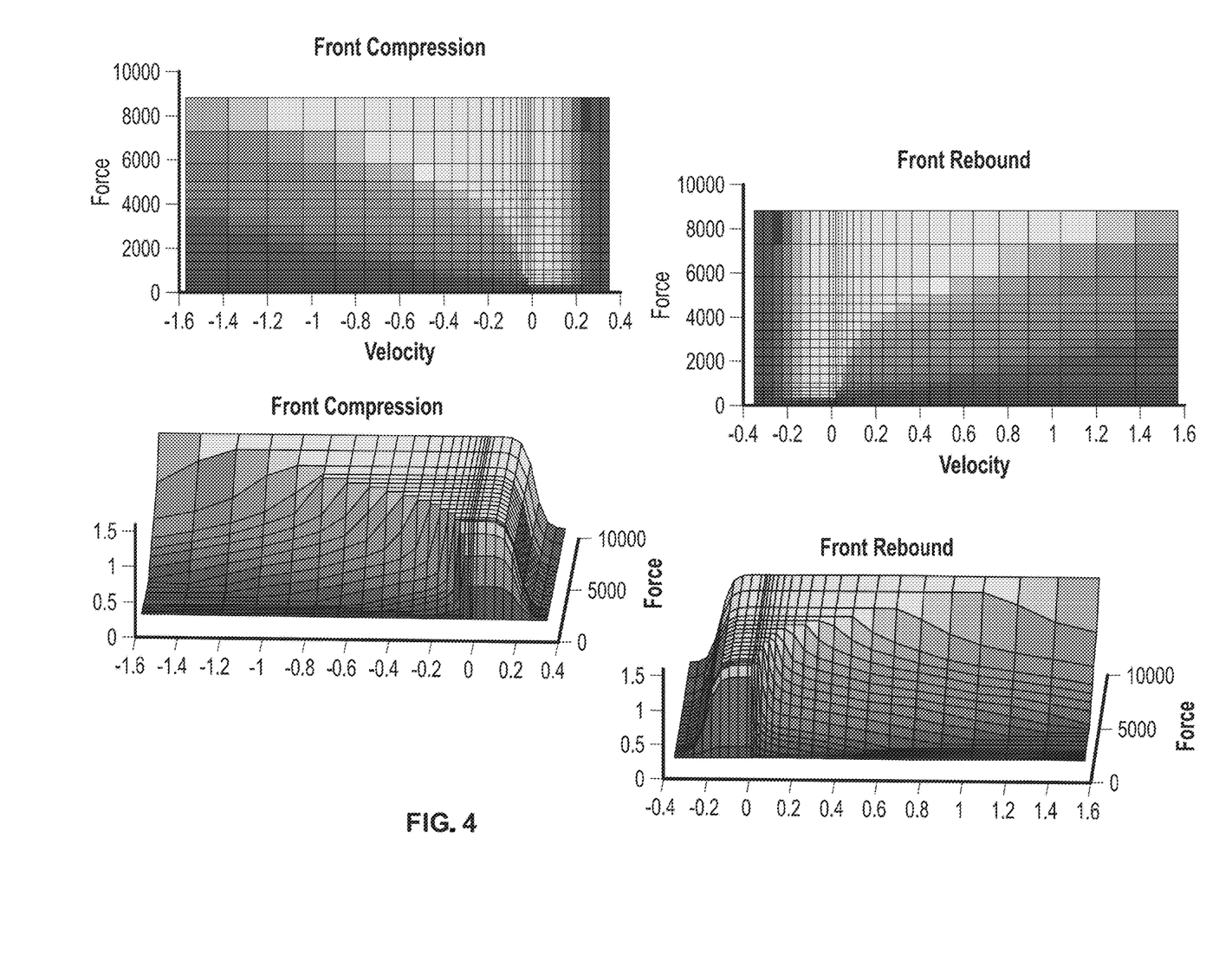
FIG. 4 shows a plot of rebound and compression force versus displacement for an example damper assembly, in accordance with an example.

In another example illustration, as a damper moves in one direction, a force request is "fed forward" to a chamber of the damper working in an opposite direction. More particularly, as noted above the damper assemblies 106 may each have at least two chambers 116, 120 for applying damping resistance to movement of vehicle suspension, working in opposing directions to each other. As it is generally expected that motion of the damper 106 in one direction will soon reverse as the vehicle travels over a bump, a request for force to a damper working in an opposite direction to that of the damper travel in real time may be supplied. Accordingly, the opposing damper is better able to provide immediate damping effect once the motion of the damper does reverse. This aspect of the present disclosure advantageously may address issues for dampers when crossing "zero velocity," e.g., during a transition from one direction to the other. More particularly, current supplied to the damper will generally need to be at a maximum, since damping force applied is a function of velocity. For example, as seen in FIG. 4, in an example plot of force versus velocity in a rebound damper and a compression current inputs are generally at a maximum—where velocity is zero, current approaches a maximum (as represented in the lower two plots in FIG. 4, where current is shown at or near the maximum value illustrated). Additionally, as processing power of example systems is not infinite, some small delay, e.g., of a few milliseconds, may occur between the time at which a controller sends a damping force or current command to a damper and the time that the damper executes the requested force/current command. A mechanical delay (e.g., a delay between when a change in current is applied to a valve and when the valve assumes the position corresponding to the current) may result in an additional delay, e.g., of less than five milliseconds, which may be comparable or even slightly quicker than the processing/software delay. Even these relatively small delay(s) may be significant in the context of a damping or suspension system, where inputs to the damper may occur in a matter of milliseconds—e.g., input magnitude can change, direction of the damper can reverse, etc.

Accordingly, by advancing the request for current/force to the opposing chamber, the opposing chamber is more likely to be able to respond in time for a rebound in an opposite direction. The amount of time of the "forward" feed or advance may be determined based upon an expected processing and/or mechanical delay. Merely by way of example, where it is expected that a processor and/or software delay of 5 milliseconds is typical, commands to an opposing chamber may be advanced by a similar or identical amount of time.

In an example of this feed-forward aspect, at block 308 (see FIG. 3A) the controller 108 may feed forward force to an opposing chamber of a damper assembly 106 based upon various vehicle and/or surface conditions. For example, when a driver attempts to accelerate the vehicle 100 rapidly from a standstill, the controller 108 may feed forward force to compression chambers 116 of the rear damper assemblies 106, in an effort to reduce squat of the vehicle 100. The vehicle 100 and/or controller 108 may use any metrics or inputs that are convenient. For example, a pitch velocity of the vehicle input to the controller 108 may be used to determine the onset of squat. The controller 108 may thereby output a force request, e.g., by modifying a gain of the controller 108, which is output to a damper current to compression valve 128. In an example, a rate of change of torque demand, e.g., due to a rapid movement of an accelerator pedal of the vehicle, is used to determine that the vehicle is about to accelerate quickly. In response, the controller 108 may scale a compression force demand at both of the rear damper assemblies 106c and 106d, and also a rebound demand at the front dampers 106a and 106b to resist the expected pitch of the vehicle 100. In the example vehicle 100, the currents to the damper assemblies has been achieved as measured at the damper assemblies 106 before the vehicle 100 begins to pitch.

Roughness Approximation

As noted above, aspects of the above damping system 102 and associated methods disclosed herein may be employed in the context of a suspension system 104 that allows for adjustments to a ride height of the vehicle. For example, as noted above the suspension system 104 may employ air springs that facilitate raising and lowering the vehicle 100 to adjust ride height, and ride height sensors 114 at each of the wheels. The ride height sensors 114 may be used to determine a roughness of a surface being traversed by the vehicle 100, as described below. However, any other method for determining roughness may be used, and roughness need not be determined from ride height sensors as described further below.

In at least some example approaches, roughness may be approximated based upon vertical displacement of the wheels away from an expected or neutral position as the vehicle traverses a surface. When driving on a very smooth surface, vehicle wheels may tend to experience minimal vertical movement. On rough surfaces, however, road inputs will drive greater vertical displacement of the wheels away from their neutral position. Example road roughness metrics may be determined using a function or algorithm that generally attempts to quantify how much road input the wheels experience over a fixed distance, as a proxy for the roughness of the road/ground surface. The quantified roughness may be used to influence operation of the suspension, e.g., by setting or altering control tolerances, and/or changing damper settings, in response to changes in roughness. Example vehicles, suspension systems, and methods may thus be directed to determining a roughness of a surface being traversed by the vehicle based on ride height measurements and changing a damper setting for the damping system based on the determined roughness.

Figure 5:
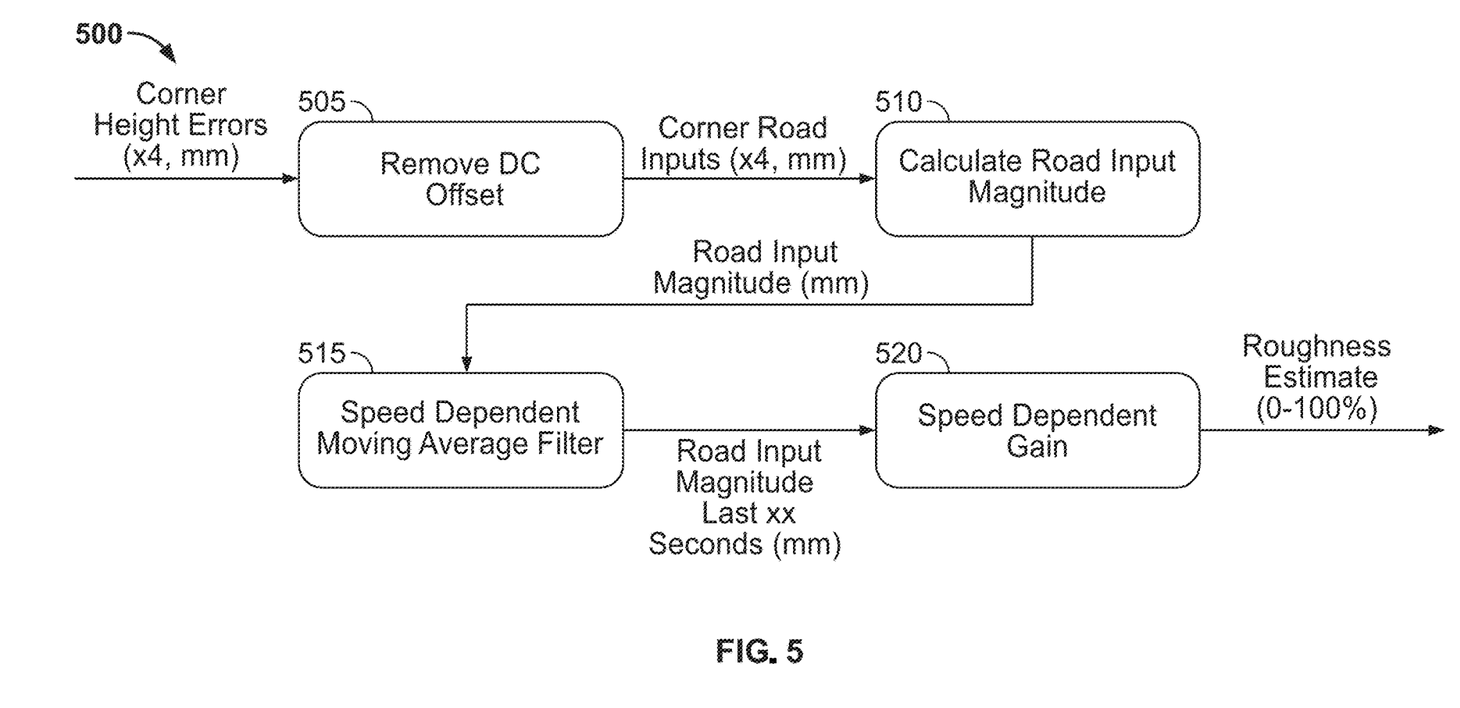
FIG. 5 shows a process flow diagram for a method of estimating a roughness of a surface being traversed by a vehicle, according to an example.

Turning now to FIG. 5, an example process 500 for determining a roughness metric is illustrated and described in further detail. The process 500 generally determines roughness on the basis of ride height data, e.g., as collected by the ride height sensors 114 of the vehicle 100.

In some example approaches such as illustrated in FIG. 5, a surface or roughness metric may be based on a change in corner height error. As used herein, a corner height error is defined as a difference between expected ride height and the actual/measured ride height, which may be determined by ride height sensors of the vehicle. Further, in some examples the roughness metric employs a moving average of the corner height error over a given time window or period. While examples herein are generally directed to changing damper setting(s) of a damping system of the vehicle 100, any other suspension parameters may be adjusted in response to detected changes in roughness that are convenient. Accordingly, to any extent a suspension parameter is capable of adjustment by the vehicle 100 and may be affected by variations in roughness of a surface being traversed by vehicle 100, the vehicle 100 may adjust that parameter in response to detected variations in roughness.

As mentioned above, determination of roughness of a surface is not limited to the examples herein, and methods for determining roughness based on inputs or factors other than ride height may be employed. Merely as one example, roughness may be determined based upon a derivative or a change in corner height over time.

The process 500 may generally be employed when the vehicle is moving, and as such process 500, e.g., using the controller/vehicle dynamics module 108, may confirm or query the vehicle 100 is in motion before employing process 500 to determine a roughness metric. It should be noted that, alternatively, a previously determined roughness may be stored in a non-volatile memory of the vehicle, which may be used as the initial value of the estimator if it has not had any chance to calculate before the suspension is required to operate. This may be useful, e.g., for situations in which the vehicle is parked upon a rough surface, so that roughness is considered upon subsequent use of the vehicle, avoiding the vehicle suspension seeming overactive due to the rough surface. As an input to process 500, corner height error(s) of one or more wheels of the vehicle 100 may be determined. In the example process 500, measurements are made based upon signals received from the four sensors 114, each of which are positioned at a respective wheel of the vehicle 100 as noted above. Other numbers of sensors and wheels are possible in other example approaches. Generally, corner height error(s) may be determined based upon a difference between an expected or target height and an actual height, e.g., as measured by ride height sensor(s) 114. Expected or target height may be determined in any manner that is convenient. Merely by way of example, the target may be a desired ride height, e.g., 11.5" for an off-road mode of the vehicle 100, or a target corner height of one or more air springs of the suspension system 104. A target height of a particular corner or location of the vehicle, e.g., where an air spring is positioned, may vary dynamically as the vehicle moves. As such, a target height may be adjusted to account for factors such as acceleration, deceleration, cornering, pitch, roll, and the like. In an example, the sensors 114 are displacement sensors that measure a displacement of the wheel from the vehicle 100, although in other examples a wheel accelerometer or the like may be used.

At block 505 of process 500, the controller 108 may convert the corner height error to a delta or change in the corner height error measurement over a given time period. Initially, it should be understood that the controller 108 may generally always have some non-zero amount of height error which causes a DC-offset. As described in further detail below, DC-offset generally refers to a physical offset error in measurement, and can result from multiple sources, e.g., a bent sensor arm, an asymmetrically loaded vehicle, etc. To prevent this DC-offset from being counted as road/surface input, process 500 may remove the DC-offset from the corner height error measurements. Further, at block 505 it may also be desired to remove the effects of pitch or roll of the vehicle or other generally constant inputs to the suspension that are not caused by roughness. For example, where vehicle 100 is leaning to the passenger side while traversing a left turn, corner height errors may be present as a result of the lean of the vehicle, but this effect is not caused by roughness. By comparison, where the vehicle 100 is traversing a rough surface, corner height errors at the wheel(s) of the vehicle 100 may be rapidly changing as the wheel is jostled up and down. Accordingly, process 500 may convert the input corner height error to a delta or change in the corner height errors over time. In doing so, the controller 108 may generally remove more static effects caused by non-road roughness effects. Accordingly, a result of block 505 may be a "corner surface input" at each wheel.

Proceeding to block 510, process 500 may determine a road or surface input magnitude, e.g., by summing the absolute value of the corner surface inputs determined at block 505. Accordingly, process 500 is agnostic regarding whether the surface/road inputs are positive or negative (i.e., whether the rough surface is driving the wheels up/down), and the surface input is simplified by determining the absolute value of the changes in the individual corner height errors, and adding them together. Process 500 may then proceed to block 515.

At block 515, a speed dependent moving average filter may be applied to the input surface input magnitude. Generally, instantaneous measurement of surface input magnitude may be a very noisy signal. Roughness of a surface, for example, may be obtained by applying a speed-dependent moving average filter in an effort to normalize measurements for a length of road. For example, a filter time constant may be scaled with vehicle speed to achieve different behaviors at low speeds versus high speeds. For example, at relatively lower speeds a smaller time constant may be used, as it is desirable at low speeds for the roughness estimate to emphasize terrain that vehicle 100 has immediately traversed. In other words, it may be desirable to interpret single events such as a curb impact or rock crawl as a relatively rough surface and reduce the extent to which levelling events might occur. This smaller time constant may be useful for rock crawling or parking on top of a curb in a busy parking lot, merely by way of example. By contrast, a relatively larger time constant may be used at higher speeds, as the roughness estimate may tend to be less noisy but more closely reflective of the general roughness of the road surface (as opposed to discrete low-speed events or inputs, e.g., that may be typical of rock crawling). The relatively greater time constant may be useful in reducing the effect of a single input at relatively higher speed, which may be less meaningful when the surface is otherwise relatively smooth, and as a result it may be more desirable for levelling events to proceed at such higher speeds. Any filter device or filtering methodology may be employed. In an example, a 1st-order low-pass infinite impulse response (IIR) filter may be employed, thereby outputting an exponentially weighted moving average filter. After block 515, process 500 may have a surface input magnitude over a previous time window.

Proceeding to block 520, process 500 may apply a speed dependent gain determination to determine a final estimate of roughness, e.g., as a percentage. A gain of this determination may be speed-dependent, with a similar rationale as the filter time constant of block 515. Accordingly, at a lower speed a relatively larger gain may be employed, while a smaller gain may be employed at a higher speed. In this manner, individual wheel displacements for lower speed events, e.g., like driving up on a curb, are treated as a very rough road. In a further example, a 40 millimeter (mm) displacement on one wheel may be observed at a vehicle speed of 20 kilometers/hour, which is treated as a very rough road from the perspective of the ride height controller, i.e., controller 108. By comparison, at higher speeds a relatively smaller gain may be applied, as it may be desirable for the roughness metric to capture larger wheel displacement events but ignore smaller events that are frequently seen while driving at high speeds even on relatively smooth surfaces. Process 500 may terminate, upon determination of the roughness metric.

Figure 6:
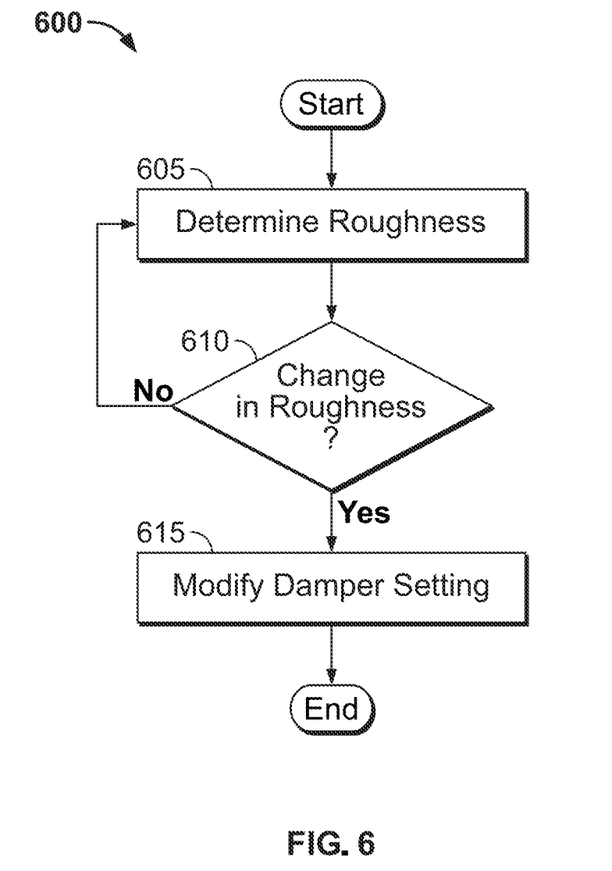
FIG. 6 shows a process flow diagram for a method of modifying a damper setting, according to an example.

Referring now to FIG. 6, an example process 600 for modifying damper settings for vehicle 100, is illustrated and described in further detail. Process 600 may begin at block 605, where roughness may be determined. Roughness may be determined, e.g., as set forth above by a roughness metric. For example, upon detection that the vehicle 100 is in motion or turned on, controller 108 may determine a roughness metric of a surface being traversed by the vehicle 100 based on ride height measurements. In an example, block 605 employs process 500 to determine the roughness metric. Process 600 may then proceed to block 610.

At block 610, process 600 queries whether a change in the roughness has taken place, e.g., based on the roughness metric determined at block 605. In some examples, the query at block 610 obtains a positive result only when the roughness metric changes at least by a threshold amount or percentage. Accordingly, the vehicle 100 can be prevented from making changes to suspension settings or ride height adjustment tolerances in response to small variations in terrain. Where block 610 obtains a positive result, process 600 may proceed to block 615, where a damper setting, e.g., a compliance of compression chamber 116 or rebound chamber 120 of one or more of the damper assemblies 106, may be modified in accordance with the change in roughness. Accordingly, subsequent adjustments in damping provided by the damping system 102 may be affected. Alternatively, if block 610 obtains a negative result, process 600 proceeds back to block 605. Accordingly, process 600 generally may continuously monitor the roughness during operation of the vehicle 100.

Example roughness metrics, e.g., as determined using processes 500 and/or 600, may be used to scale or adjust a damper setting of the damping system 102. Generally, where roughness is relatively greater, reactive forces of one or both chambers 116, 120 of one or more of the damper assemblies 106 may be reduced in comparison to relatively smoother roads or smaller roughness metrics. Merely as one example, when vehicle 100 determines that roughness is below a predetermined threshold (i.e., indicating a relatively smooth ground surface), a relatively higher reactive force in one or more of the damper assemblies 106 may be employed by controller 108. By comparison, a relatively smaller reactive force may be employed by the controller 108 it is determined that the surface being traversed by the vehicle 100 is above the predetermined roughness threshold (i.e., indicating a relatively rougher ground surface).

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Accordingly, the bounds of the claimed invention(s) should be determined from the claims and is not limited by the present disclosure. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The foregoing description includes exemplary embodiments in accordance with the present disclosure. These examples are provided for purposes of illustration only, and not for purposes of limitation. It will be understood that the present disclosure may be implemented in forms different from those explicitly described and depicted herein and that various modifications, optimizations, and variations may be implemented by a person of ordinary skill in the present art, consistent with the following claims.

What is claimed is:

1. A damping system for suspension of a vehicle, comprising:
a controller configured to:
determine a corner height error based on a difference between an actual corner height and an expected corner height;
apply a filter to the corner height error to generate a filtered corner height error, wherein the filter is based on a speed of the vehicle;
determine a roughness of a ground surface associated with the vehicle based on the filtered corner height error; and
determine a damper setting for the damping system based on the determined roughness.

2. The damping system of claim 1, wherein the damper setting decreases a reaction force of a damper in response to an increase in the roughness.

3. The damping system of claim 1, wherein the controller is configured to alter a gain of the controller based upon a ride height of the vehicle.

4. The damping system of claim 1, wherein the controller is configured to increase a reaction force of a damper based on the damper approaching an end of travel of the damper.

5. The damping system of claim 1, wherein the controller is configured to advance a force request to an opposing chamber of a damper based on the damper approaching an end of travel of the damper.

6. The damping system of claim 1, wherein the damper setting is altered by changing a current supplied to a damper.

7. The damping system of claim 1, wherein the determined roughness comprises a numerical value corresponding to a percentage from 0 to 100%.

8. The damping system of claim 1, wherein the roughness is determined based on a change in the filtered corner height error over a time period corresponding to the ground surface traversed during the time period.

9. The damping system of claim 1, further comprising an air suspension subsystem, wherein the controller is a vehicle dynamics module further configured to control a ride height of the vehicle via the air suspension subsystem.

10. The damping system of claim 1, further comprising one or more dampers of the vehicle, wherein the one or more dampers are actuated by the controller.

11. The damping system of claim 1, wherein the controller is configured to return the damper setting to a nominal value based upon a detection of a decrease in the roughness.

12. The damping system of claim 1, wherein the controller is further configured to:
determine a gain based on the speed of the vehicle; and
determine the damper setting further based on the gain.

13. A method, comprising:
determining, using a controller, a corner height error based on a difference between an actual corner height and an expected corner height of a vehicle;
applying, using the controller, a filter to the corner height error to generate a filtered corner height error, wherein the filter is based on a speed of the vehicle;
determining, using the controller, a roughness of a ground surface associated with the vehicle based on the filtered corner height error; and
determining, using the controller, a damper setting of the vehicle based on the determined roughness.

14. The method of claim 13, further comprising decreasing a reaction force of a damper in response to an increase in the roughness.

15. The method of claim 13, further comprising altering a gain of the controller based upon a ride height of the vehicle.

16. The method of claim 13, further comprising increasing a reaction force of a damper based on the damper approaching an end of travel of the damper.

17. The method of claim 13, further comprising advancing a force request to an opposing chamber of a damper based on the damper approaching an end of travel of the damper.

18. The method of claim 13, further comprising returning the damper setting to a nominal value based upon a detection of a decrease in the determined roughness.

19. The method of claim 13, further comprising:
determining a gain based on the speed of the vehicle; and
determining the damper setting further based on the gain.

20. A non-transitory computer-readable medium having non-transitory computer-readable instructions encoded thereon that, when executed by a processor, cause the processor to:
determine a corner height error based on a difference between an actual corner height and an expected corner height of a vehicle;
apply a filter to the corner height error to generate a filtered corner height error, wherein the filter is based on a speed of the vehicle;
determine a roughness of a ground surface associated with the vehicle based on the filtered corner height error; and
determine a damper setting of the vehicle based on the determined roughness.

* * * * *